United States Patent [19]

Krenzer

[11] 3,864,775

[45] Feb. 11, 1975

[54] DIALKYL ACETALS OF HETEROCYCLIC UREIDOACETALDEHYDE

[75] Inventor: John Krenzer, Oak Park, Ill.

[73] Assignee: Velsicol Chemical Corporation, Chicago, Ill.

[22] Filed: May 21, 1973

[21] Appl. No.: 362,033

Related U.S. Application Data

[62] Division of Ser. No. 208,944, Dec. 16, 1971, Pat. No. 3,787,432.

[52] U.S. Cl. .................................................. 71/90
[51] Int. Cl. ............................................. A01n 9/12
[58] Field of Search ........................................ 71/90

[56] References Cited
UNITED STATES PATENTS

| | | | |
|---|---|---|---|
| 3,669,982 | 6/1972 | Cebalo et al. ............... | 260/306.8 D |
| 3,779,736 | 12/1973 | Doyle, Jr. .................... | 71/90 |

Primary Examiner—Lewis Gotts
Assistant Examiner—Catherine L. Mills
Attorney, Agent, or Firm—Robert J. Schwarz; Dietmar H. Olesch

[57] ABSTRACT

This invention discloses new chemical compounds of the formula

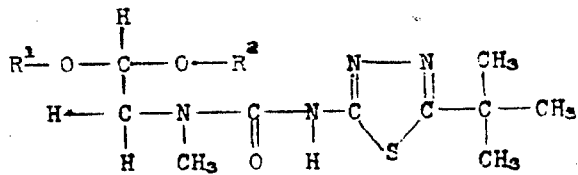

wherein $R^1$ and $R^2$ are each alkyl of up to 3 carbon atoms. Further disclosed are herbicidal compositions utilizing the above defined compounds.

5 Claims, No Drawings

DIALKYL ACETALS OF HETEROCYCLIC UREIDOACETALDEHYDE

This application is a division of the copending application Ser. No. 208,944 filed Dec. 16, 1971, now U.S. Pat. No. 3,787,432.

This invention relates to new compositions of matter and more particularly relates to new chemical compounds of the formula

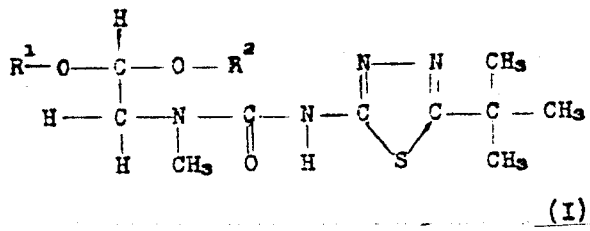

wherein $R^1$ and $R^2$ are each alkyl of up to 3 carbon atoms.

The compounds of this invention have unexpected activity as herbicides and control a wide variety of weeds without significantly harming beneficial plants such as corn or rice.

The compounds of this invention can be readily prepared from the isocyanate dimer of the formula

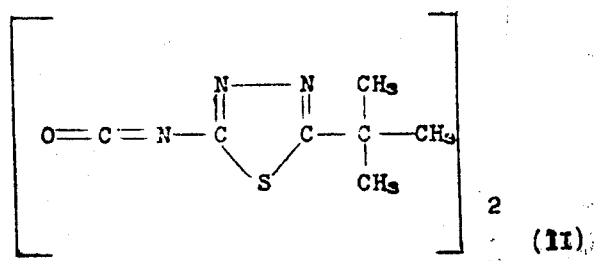

by reaction with a dialkyl acetal of the formula

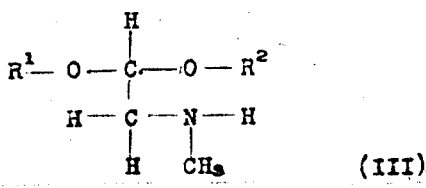

wherein $R^1$ and $R^2$ are each alkyl of up to 3 carbon atoms. This reaction can be effected by heating a mixture of a molar amount of the isocyanate of formula II with about two molar amounts of the acetal of formula III is an inert organic reaction medium such as benzene at the reflux temperature of the mixture. Heating at reflux can be continued for a period of from about 2 to about 30 minutes to ensure completion of the reaction. After this time the desired product can be recovered upon evaporation of the reaction medium and can be used as such or can be further purified by standard techniques in the art such as recrystallization and the like.

The compound of formula II can be prepared by the procedure detailed in Example 1. The preparation of the compounds of the present invention is more specifically illustrated in the following examples.

EXAMPLE 1

Preparation of 2-t-Butyl-1,3,4-thiadiazol-5-yl Isocyanate Dimer

A saturated solution of phosgene in ethyl acetate (100 ml) was charged into a glass reaction vessel equipped with a mechanical stirrer. A slurry of 2-t-butyl-5-mino-1,3,4-thiadiazole (10 grams) in ethyl acetate (300 ml) was added to the reaction vessel and the resulting mixture was stirred for a period of about 16 hours resulting in the formation of a precipitate. The reaction mixture was then purged with nitrogen gas to remove unreacted phosgene. The purged mixture was then filtered to recover the desired product 2-t-butyl-1,3,4-thiadiazol-5-yl-isocyanate dimer as a solid having a melting point of 261° to 263°C.

EXAMPLE 2

Preparation of the Dimethyl Acetal of 2[1-methyl-3-(2-t-butyl-1,3,4-thiadiazol-5-yl)ureido]acetaldehyde A mixture of 2-t-butyl-1,3,4-thiadiazol-5-yl isocyanate dimer (6 grams), the dimethyl acetal of 2-methylaminoacetaldehyde (3.9 grams) and benzene (50 ml) was charged into a glass reaction flask equipped with a mechanical stirrer and reflux condenser. The reaction mixture was heated at reflux, with stirring for a period of about 5 minutes. After this time the reaction mixture was stripped of benzene to yield an oil which solidified upon standing. The resulting solid was then recrystallized from pentane to yield the desired product the dimethyl acetal of 2-[1-methyl-3-(2-t-butyl-1,3,4-thiadiazol-5-yl)-ureido]acetaldehyde having a melting point of 80°-82°C.

EXAMPLE 3

Preparation of the Diethyl Acetal of 2-[1-methyl-3-(2-t-butyl-1,3,4-thiadiazol-5-yl)ureido]acetaldehyde A mixture of 2-t-butyl-1,3,4-thiadiazol-5-yl isocyanate dimer (6 grams), the diethyl acetal of 2-methylaminoacetaldehyde (4 grams) and benzene (50 ml) is charged into a glass reaction flask equipped with a mechanical stirrer and reflux condenser. The reaction mixture is heated at reflux, with stirring for a period of about 10 minutes. After this time the reaction mixture is stripped of benzene to yield a solid product. This product is the diethyl acetal of 2[1-methyl-3-(2-t-butyl-1,3,4-thiadiazol-5-yl)ureido]acetaldehyde.

EXAMPLE 4

Preparation fo the Diisopropyl Acetal of 2-[1-methyl-3-(2-; and t-butyl-1,3,4-thiadiazol-5-yl)ureido]acetaldehyde A mixture of 2-t-butyl-1,3,4-thiadiazol-5-yl isocyanate dimer (6 grams), the diisopropyl acetal of 2-methylaminoacetaldehyde (4.2 grams) and benzene (50 ml) is charged into a glass reaction flask equipped with a mechanical stirrer and reflux condenser. The reaction mixture is heated at reflux, with stirring for a period of about 10 minutes. After this time the reaction mixture is stripped of benzene to yield a solid product. This product is recrystallized from pentane to yield the desired product the diisopropyl acetal of 2-[1-methyl-3-(2-t-butyl-1,3,4-thiadiazol-5-yl)ureido]acetaldehyde.

For practical use as herbicides the compounds of this invention are generally incorporated into herbicidal compositions which comprise an inert carrier and a herbicidally toxic amount of such a compound. Such herbicidal compositions, which can also be called formulations, enable the active compound to be applied conveniently to the site of the weed infestation in any desired quantity. These compositions can be solids such as dusts, granules, or wettable powders; or they can be liquids such as solutions, aerosols, or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculities, usually of a particle size range of from about 0.3 to 1.5 mm. Wettable powders, which can be dispersed in water or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of herbicides can be dispersed under superatmospheric pressure as aerosols. However, preferred liquid herbicidal compositions are emulsifiable concentrates, which comprise an active compound according to this invention and as the inert carrier, a solvent and an emulsifier. Such emulsifiable concentrates can be extended with water and or oil to any desired concentration of active compound for application as sprays to the site of the weed infestation. The emusifiers most commonly used in these concentrates are nonionic or mixtures of nonionic with anionic surface-active agents. With the use of some emulsifier systems an inverted emulsion (water in oil) can be prepared for direct application to weed infestations.

A typical herbicidal composition according to this invention is illustrated by the following example, in which the quantities are in parts by weight.

EXAMPLE 5

Preparation of a Dust

| Product of Example 2 | 10 |
| Powdered Talc | 90 |

The above ingredients are mixed in a mechanical grinder-blender and are ground until a homogeneous, free-flowing dust of the desired particle size is obtained. This dust is suitable for direct application to the site of the weed infestation.

The compounds of this invention can be applied as herbicides in any manner recognized by the art. One method for the control of weeds comprises contacting the locus of said weeds with a herbicidal composition comprising an inert carrier and as an essential active ingredient, in a quantity which is herbicidally toxic to said weeds, a compound of the present invention. The concentration of the new compounds of this invention in the herbicidal compositions will vary greatly with the type of formulation and the purpose for which it is designed, but generally the herbicidal compositions will comprise from about 0.05 to about 95 percent by weight of the active compounds of this invention. In a preferred embodiment of this invention, the herbicidal compositions will comprise from about 5 to about 75 percent by weight of the active compound. The compositions can also comprise such additional substances as other pesticides, such as insecticides, nematocides, fungicides, and the like; stabilizers, spreaders, deactivators, adhesives, stickers, fertilizers, activators, synergists, and the like.

The compounds of the present invention are also useful when combined with other herbicides and/or defoliants, dessicants, growth inhibitors, and the like in the herbicidal compositions heretofore described. These other materials can comprise from about 5% to about 95% of the active ingredients in the herbicidal compositions. Use of combinations of these other herbicides and/or defoliants, dessicants, etc. with the compounds of the present invention provide herbicidal compositions which are more effective in controlling weeds and often provide results unattainable with separate compositions of the individual herbicides. The other herbicides, defoliants, dessicants and plant growth inhibitors, with which the compounds of this invention can be used in the herbicidal compositions to control weeds, can include chlorophenoxy herbicides such as 2,4-D, 2,4,5-T, MCPA, MCPB, 4(2,4-DB), 2,4-DEB, 4-CPB, 4-CPA, 4-CPP, 2,4,5-TB, 2,4,5-TES, 3,4-DA, silvex and the like; carbamate herbicides such as IPC, CIPC, swep, barban, BCPC, CEPC, CPPC, and the like; thiocarbamate and dithiocarbamate herbicides such as CDEC, metham sodium, EPTC, diallate, PEBC, perbulate, vernolate and the like; substituted urea herbicides such as norea, siduron, dichloral urea, chloroxuron, cycluron, fenuron, monuron monuron TCA, diuron, linuron, monolinuron, neburon, buturon, trimeturon and the like; symmetrical triazine herbicides such as simazine, chlorazine, atraone, desmetryne, norazine, ipazine, prometryn, atrazine, trietazine, simetone, prometone, propazine, ametryne, and the like; chloroacetamide herbicides such as alpha-chloro-N,N-dimethylacetamide, CDEA, CDAA, alpha-chloro-N-isopropylacetamide, 2-chloro-N-isopropylacetanilide, 4-(chloroacetyl)morpholine, 1-(chloroacetyl)piperidene, and the like; chlorinated aliphatic acid herbicides such as TCA, dalapon, 2,3-dichloropropionic acid, 2,2,3-TPA and the like; chlorinated benzoic acid and phenylacetic acid herbicides such as 2,3,6-TBA, 2,3,5,6-TBA, dicamba, tricamba, amiben, fenac, PBA, 2-methoxy-3,6-dichlorophenylacetic acid, 3-methoxy-2,6-dichlorophenylacetic acid, 2-methoxy-3,5,6-trichlorophenylacetic acid, 2,4-dichloro-3-nitrobenzoic acid and the like; and such compounds as aminotriazole, maleic hydrazide, phenyl mercuric acetate, endothal, biuret, technical chlordane, dimethyl 2,3,5,6-tetrachloroterephthalate, diquat, erbon, DNC, DNBP, dichlobenil, DPA, diphenamid, dipropalin, trifluralin, solan, dicryl, merphos, DMPA, DSMA, MSMA, potassium azide, acrolein, benefin, bensulide, AMS, bromacil, 2-(3,4-dichlorophenyl)-4-methyl-1,2,4-oxadiazolidine-3,5-dione, bromoxynil, cacodylic acid, CMA, CPMF, cypromid, DCB, DCPA, dichlone, diphenatril, DMTT, DNAP, EBEP, EXD, HCA, ioxynil, IPX, isocil, potassium cyanate, MAA, MAMA, MCPES, MCPP, MH, molinate, NPA, OCH, paraquat, PCP, picloram, DPA, PCA, pyrichlor, sesone, terbacil, terbutol, TCBA, brominil, CP-50144, H-176-1, H-732, M-2901, planavin, sodium tetraborate, calsium cyanamid, DEF, ethyl xanthogen disulfide, sindone, sindone B, propanil and the like.

Such herbicides can also be used in the methods and compositions of this invention in the form of their salts, esters, amides, and other derivatives whenever applicable to the particular parent compounds.

Weeds are undesirable plants growing where they are not wanted, having no economic value, and interfering with the production of cultivated crops, with the growing of ornamental plants, or with the welfare of livestock. Many types of weeds are known, including annuals such as pigweed, lambsquarters, foxtail, crabgrass, wild mustard, dield pennycress, ryegrass, goose-grass, chickweed, wild oats, velvet leaf, purselane, barnyard grass, smartweed, knotweed, cocklebur, wild buckwheat, kochia, medic, corn cockle, ragweed, sowthistle, coffee-weed, croton, cuphea, dodder, fumitory, groundsel, hemp nettle, knowel, spurge, spurry, emex, jungle rice, pondweed, dog fennel, carpetweed, morning glory, bedstraw, ducksalad and naiad; biennials such as wild carrot, matricaria, wild barley, campion, chamomile, burdock, mullein, round-leaved mallow, bull thistle, hounds-tongue, moth mullein, and purple star thistle; or perennials such as white cockle, perennial rye-grass, quackgrass, Johnson grass, Canada thistle, hedge bindweed, Bermuda grass, sheep sorrel, curly dock, nutgrass, field chickweed, dandelion, campanula, field bindweed, Russian knapweed, mesquite, toadflax, yarrow, aster, gromwell, horsetail, ironweed, sesbania, bulrush, cattail and winter-cress.

Simarly, such weeds can be classified as broadleaf or grassy weeds. It is economically desirable to control the growth of such weeds without damaging beneficial plants or livestock.

The new compounds of this invention are particularly valuable for weed control because they are toxic to many species and groups of weeds while they are relatively nontoxic to many beneficial plants. The exact amount of compound required will depend on a variety of factors, including the hardiness of the particular weed species, weather, type of soil, method of application, the kind of beneficial plants in the same area, and the like. Thus, while the application of up to only about one or two ounces of active compound per acre may be sufficient for good control of a light infestation of weeds growing under adverse conditions, the application of ten pounds or more active compound per acre may be required for good control of a dense infestation of hardy perennial weeds growing under favorable conditions.

The herbicidal toxicity of the new compounds of this invention can be illustrated by many of the established testing techniques known to the art, such as pre- and post- emergence testing.

The herbicidal activity of the compounds of this invention was demonstrated by experiments carried out for the pre-emergence control of a variety of weeds. In these experiments small plastic greenhouse pots filled with dry soil were seeded with the weed seeds. Twenty-four hours or less after seeding the pots were sprayed with water until the soil was wet and the test compounds formulated as aqueous emulsions of acetone solutions containing emulsifiers were sprayed at the indicated dosage on the surface of the soil.

After spraying, the soil containers were placed in the greenhouse and provided with supplementary heat as required and daily or more frequent watering. The plants were maintained under these conditions for a period of 20 days, at which time the condition of the plants and the degree of injury to the plants was rated on a scale of from 0 to 10, as follows: 0 = no injury, 1,2 = slight injury, 3,4 = moderate injury, 5,6 = moderately severe injury, 7,8,9 = severe injury and 10 = death. The effectiveness of these componds is demonstrated by the data in Table I.

The herbicidal activity of the compounds of this invention was also demonstrated by experiments carried out for the post-emergence control of a variety of weeds. In these experiments the compounds to be tested were formulated as aqueous emulsions and sprayed at the indicated dosage on the foliage of the weeds that have attained a prescribed size. After spraying, the plants were placed in a greenhouse and watered daily or more frequently. Water was not applied to the foliage of the treated plants. The severity of the injury was determined 13 days after treatment and was rated on the scale of from 0 to 10 as heretofore described. The effectiveness of these compounds is demonstrated by the data in Table II.

TABLE I

Pre-emergence Herbicide Activity of the Product of Ex. 2

| | Injury Rating Rate in lbs/acre | | | |
|---|---|---|---|---|
| Weed | 10 | 4 | 2 | 1 |
| Wild Oats | 10 | 10 | 10 | 10 |
| Jimsonweed | 10 | 10 | 9 | 10 |
| Velvetleaf | 10 | 10 | 10 | 10 |
| Johnsongrass | 10 | 9 | 9 | 8 |
| Pigweed | 9 | 9 | 9 | 9 |
| Mustard Weed | 10 | 10 | 10 | 9 |
| Yellow Foxtail | 9 | 9 | 9 | 9 |
| Barnyard Grass | 10 | 10 | 10 | 10 |
| Crabgrass | 10 | 10 | 10 | 10 |
| Downy Brome | 9 | 9 | 9 | 8 |
| Wild Morninglory | 10 | 10 | 9 | 10 |

TABLE II

Post-emergence Herbicide Activity of the Product of EX. 2

| | Injury Rating Rate in lbs/acre | | | |
|---|---|---|---|---|
| Weed | 10 | 4 | 2 | 1 |
| Wild Oats | 10 | 9 | 8 | 9 |
| Jimsonweed | 10 | 10 | 10 | 10 |
| Pigweed | 10 | 10 | 9 | 9 |
| Johnsongrass | 10 | 9 | 3 | 2 |
| Hedge Bindweed | 9 | 9 | 10 | 10 |
| Mustard Weed | 10 | 10 | 10 | 10 |
| Yellow Foxtail | 10 | 10 | 10 | 10 |
| Barnyard Grass | 10 | 10 | 10 | 10 |
| Crabgrass | 10 | 9 | 7 | 5 |
| Wild Morninglory | 10 | 10 | 10 | 10 |

I claim:

1. A herbicidal composition comprising an inert carrier and as an essential active ingredient, in a quantity toxic to weeds, a compound of the formula

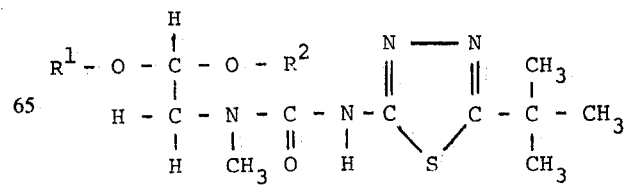

wherein $R^1$ and $R^2$ are each alkyl of up to 3 carbon atoms.

2. A method of controlling weeds which comprises contacting said weeds with a herbicidal composition of claim 1.

3. A composition of claim 1 wherein the active ingredient is the dimethyl acetal of 2-[1-methyl-3-(2-t-butyl-1,3,4-thiadiazol-5-yl)ureido]acetaldehyde.

4. A composition of claim 1 wherein the active ingredient is the diethyl acetal of 2-[1-methyl-3-(2-t-butyl-1,3,4-thiadiazol-5-yl)ureido]acetaldehyde.

5. A composition of claim 1 wherein the active ingredient is the dipropyl acetal of 2-[1-methyl-3-(2-t-butyl-1,3,4-thiadiazol-5-yl)ureido]acetaldehyde.

* * * * *

UNITED STATES PATENT OFFICE
CERTIFICATE OF CORRECTION

PATENT NO. : 3,864,775
DATED : February 11, 1975
INVENTOR(S) : John Krenzer

It is certified that error appears in the above-identified patent and that said Letters Patent are hereby corrected as shown below:

In column 2, line 52, delete "; and".

Signed and sealed this 6th day of May 1975.

(SEAL)
Attest:

RUTH C. MASON
Attesting Officer

C. MARSHALL DANN
Commissioner of Patents
and Trademarks